US008818171B2

(12) United States Patent
Soroushian et al.

(10) Patent No.: US 8,818,171 B2
(45) Date of Patent: Aug. 26, 2014

(54) SYSTEMS AND METHODS FOR ENCODING ALTERNATIVE STREAMS OF VIDEO FOR PLAYBACK ON PLAYBACK DEVICES HAVING PREDETERMINED DISPLAY ASPECT RATIOS AND NETWORK CONNECTION MAXIMUM DATA RATES

(76) Inventors: Kourosh Soroushian, San Diego, CA (US); Auke van der Schaar, Los Angeles, CA (US)

( * ) Notice: Subject to any disclaimer, the term of this patent is extended or adjusted under 35 U.S.C. 154(b) by 0 days.

(21) Appl. No.: 13/432,521

(22) Filed: Mar. 28, 2012

(65) Prior Publication Data
US 2013/0051768 A1 Feb. 28, 2013

Related U.S. Application Data

(60) Provisional application No. 61/529,204, filed on Aug. 30, 2011.

(51) Int. Cl.
| | |
|---|---|
| *H04N 5/92* | (2006.01) |
| *H04N 7/26* | (2006.01) |
| *H04N 5/85* | (2006.01) |
| *H04N 21/2343* | (2011.01) |
| *H04N 9/80* | (2006.01) |

(52) U.S. Cl.
CPC .......... *H04N 7/26* (2013.01); *H04N 19/00236* (2013.01); *H04N 5/85* (2013.01); *H04N 19/00127* (2013.01); *H04N 21/23439* (2013.01); *H04N 21/234363* (2013.01); *H04N 9/80* (2013.01)
USPC ........................................................ 386/248

(58) Field of Classification Search
CPC ............. H04N 7/26; H04N 9/80; H04N 5/85; H04N 9/8042; G11B 27/105; G11B 27/329; G11B 2220/2562

USPC ............................................................. 386/248
See application file for complete search history.

(56) References Cited

U.S. PATENT DOCUMENTS

| | | |
|---|---|---|
| 2004/0208245 A1 | 10/2004 | Macinnis et al. |
| 2005/0210145 A1 | 9/2005 | Kim et al. |

(Continued)

FOREIGN PATENT DOCUMENTS

WO 2013033334 A1 3/2013

OTHER PUBLICATIONS

International Search Report and Written Opinion for International Application PCT/US2012/053052, completed Oct. 25, 2012, 9 pgs.

*Primary Examiner* — Thai Tran
*Assistant Examiner* — William Tran
(74) *Attorney, Agent, or Firm* — KPPB LLP

(57) ABSTRACT

Systems and methods for adaptive bitrate streaming of alternative streams of video encoded at resolution and sample aspect ratio combinations and maximum bitrates in accordance with embodiments of the invention are disclosed. In one embodiment of the invention, a source encoder configured to encode a source video stream as a plurality of alternative streams of video for playback on a playback device includes a processor configured to receive multimedia content including source video data having a primary resolution, a primary sample aspect ratio, and a primary frame rate and to encode the source video data as alternative streams of video, where the resolution and sample aspect ratio of at least one of the alternative streams of video are selected to have an aspect ratio that is the same as a predetermined display aspect ratio and at least one of the alternative streams is encoded at a maximum bitrate.

4 Claims, 6 Drawing Sheets

(56) References Cited

U.S. PATENT DOCUMENTS

| | | |
|---|---|---|
| 2007/0024706 A1 | 2/2007 | Brannon, Jr. et al. |
| 2007/0053293 A1 | 3/2007 | McDonald et al. |
| 2008/0137848 A1 * | 6/2008 | Kocher et al. .................. 380/201 |
| 2009/0116821 A1 * | 5/2009 | Shibamiya et al. ........... 386/124 |
| 2011/0126104 A1 * | 5/2011 | Woods et al. .................. 715/719 |

* cited by examiner

| Video Bitrate | Minimum Adjusted Macroblocks Per Second (Example Profile 1) | Minimum Adjusted Macroblocks Per Second (Encode Profile) |
|---|---|---|
| Rate9 | 217000 | 217000 |
| Rate8 | 162000 | 162000 |
| Rate7 | 125000 | 110000 |
| Rate6 | 102000 | 60000 |
| Rate5 | 60000 | 60000 |
| Rate4 | 41000 | 26000 |
| Rate3 | 26000 | 26000 |
| Rate2 | 26000 | 26000 |
| Rate1 | 15000 | 26000 |
| Encoding Not Allowed | 0 | 0 |

FIG. 6

SYSTEMS AND METHODS FOR ENCODING ALTERNATIVE STREAMS OF VIDEO FOR PLAYBACK ON PLAYBACK DEVICES HAVING PREDETERMINED DISPLAY ASPECT RATIOS AND NETWORK CONNECTION MAXIMUM DATA RATES

CROSS-REFERENCE TO RELATED APPLICATIONS

The current application claims priority to U.S. Provisional Patent Application No. 61/529,204, filed Aug. 30, 2011, the disclosure of which is incorporated herein by reference.

FIELD OF THE INVENTION

The present invention relates to the delivery of multimedia content and more specifically streaming video content encoded at a variety of recommended maximum bitrates optimized for a variety of scaled display resolutions and network connection maximum data rates of playback devices receiving the streams.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

SUMMARY OF THE INVENTION

Systems and methods for adaptive bitrate streaming of alternative streams of video encoded at resolution and sample aspect ratio combinations and maximum bitrates corresponding to the display aspect ratios and network connection maximum data rates of playback devices receiving the streams in accordance with embodiments of the invention are disclosed. In one embodiment of the invention, a source encoder configured to encode a source video stream as a plurality of alternative streams of video for playback on a playback device includes a processor configured by an encoding application to receive multimedia content, where the multimedia content includes source video data having a primary resolution, a primary sample aspect ratio, and a primary frame rate and to encode the source video data as a set of alternative streams of video, where the resolution and sample aspect ratio of at least one of the alternative streams of video are selected to have an aspect ratio that is the same as a predetermined display aspect ratio and at least one of the alternative streams is encoded at a maximum bitrate corresponding to a predetermined network connection maximum data rate.

In another embodiment of the invention, the encoding application further configures the processor to select a resolution, sample aspect ratio, and frame rate for one of the alternative streams, determine a maximum bitrate threshold beyond which higher video quality can be achieved using a higher resolution than the selected resolution at the selected frame rate, and encode the source video stream at the predetermined network connection maximum data rate, when the predetermined network connection maximum data rate is less than the maximum bitrate threshold.

In an additional embodiment of the invention, the source encoder includes an encoding profile, where the encoding profile specifies a plurality of maximum bitrates including a maximum bitrate corresponding to the predetermined network connection maximum data rate, wherein the encoding application further configures the processor to select a resolution, sample aspect ratio and frame rate for each alternative stream, determine a maximum bitrate threshold beyond which higher video quality can be achieved using a higher resolution than the selected resolution at the selected frame rate of each alternative stream, select a maximum bitrate from the profile for each alternative stream, where the selected maximum bitrate is the highest maximum bitrate specified in the profile that is less than the maximum bitrate threshold determined for the alternative stream, and generate each alternative stream by encoding the source video stream at the selected maximum bitrate, selected resolution, sample aspect ratio and frame rate.

In yet another additional embodiment of the invention, the encoding application further configures the processor to determine a maximum bitrate threshold beyond which higher video quality can be achieved using a higher resolution than the selected resolution at the selected frame rate by configuring the processor to determine the maximum bitrate threshold using an adjusted number of macroblocks per second determined based upon the selected resolution, and frame rate.

In still another embodiment of the invention, the encoding application configures the microprocessor to determine the adjusted number of macroblocks per second (AMBPS) as follows:

$$AMBPS = ((width * height * FPS)/256) * AdjustmentFactor(FPS),$$

where width and height are the width and height of the encoding resolution, FPS is the frame rate per second for the video data, and AdjustmentFactor(FPS) is a predetermined value based on the FPS of the video data.

In yet still another additional embodiment of the invention, the adjustment factor is selected from the group including:
an AdjustmentFactor(FPS)=1, where FPS=29.97,
an AdjustmentFactor(FPS)=1.1333, where FPS=25, and
an AdjustmentFactor(FPS)=1.1606, where FPS=23.976.

In yet another embodiment of the invention, the encoding application configures the processor to determine the adjustment factor is determined as follows:

$$AdjustmentFactor(FPS) = 1 + ((MaxFPS - FPS)/(MaxFPS * 1.25))$$

where MaxFPS is Ceiling (FPS/30)*30.

Still another embodiment of the invention includes encoding a source video stream as a plurality of alternative streams of video for playback on a playback device, including receiving multimedia content using a source encoder, where the multimedia content comprises source video data having a primary resolution, a primary sample aspect ratio, and a primary frame rate and encoding the source video data using the source encoder as a set of alternative streams of video, where encoding the source video includes selecting the resolution and sample aspect ratio of at least one of the alternative streams of video to have an aspect ratio that is the same as the predetermined display aspect ratio and encoding at least one of the alternative streams at a maximum bitrate corresponding to the predetermined network connection maximum data rate.

In yet another additional embodiment of the invention, encoding a source video stream as a plurality of alternative streams of video for playback on a playback device further includes selecting a resolution, sample aspect ratio, and frame rate for one of the alternative streams, determining a maximum bitrate threshold beyond which higher video quality can be achieved using a higher resolution than the selected resolution at the selected frame rate using the source encoder, and encoding the source video stream at the predetermined network connection maximum data rate using the source encoder, when the predetermined network connection maximum data rate is less than the maximum bitrate threshold.

In still another additional embodiment of the invention, encoding a source video stream as a plurality of alternative streams of video for playback on a playback device further includes retrieving an encoding profile using the source encoder, where the encoding profile specifies a plurality of maximum bitrates including a maximum bitrate corresponding to the predetermined network connection maximum data rate, selecting a resolution, sample aspect ratio and frame rate for each alternative stream, determining a maximum bitrate threshold beyond which higher video quality can be achieved using a higher resolution than the selected resolution at the selected frame rate of each alternative stream using the source encoder, selecting a maximum bitrate from the profile for each alternative stream using the source encoder, where the selected maximum bitrate is the highest maximum bitrate specified in the profile that is less than the maximum bitrate threshold determined for the alternative stream, and generating each alternative stream using the source encoder by encoding the source video stream at the selected maximum bitrate, selected resolution, sample aspect ratio and frame rate.

In still yet another additional embodiment of the invention, determining the maximum bitrate threshold using an adjusted number of macroblocks per second determined based upon the selected resolution and frame rate.

In still another embodiment of the invention, determining the adjusted number of macroblocks per second (AMBPS) as follows:

$$AMBPS = ((width*height*FPS)/256)*AdjustmentFactor(FPS),$$

where width and height are the width and height of the encoding resolution, FPS is the frame rate per second for the video data, and AdjustmentFactor(FPS) is a predetermined value based on the FPS of the video data.

In yet another additional embodiment of the invention, the adjustment factor is selected from the group comprising:
an AdjustmentFactor(FPS)=1, where FPS=29.97;
an AdjustmentFactor(FPS)=1.1333, where FPS=25; and
an AdjustmentFactor(FPS)=1.1606, where FPS=23.976.

In still yet another embodiment of the invention, the encoding application configures the processor to determine the adjustment factor is determined as follows:

$$AdjustmentFactor(FPS)=1+((MaxFPS-FPS)/(MaxFPS*1.25))$$

where MaxFPS is Ceiling (FPS/30)*30.

Still another embodiment of the invention includes a playback device configured to playback content on a display having a display aspect ratio, including a processor configured to communicate with a memory, where the memory contains a client application, wherein the client application configures the processor to connect to a content distribution system via a network connection, where the network connection has a predetermined maximum likely data rate, obtain an index file from the content distribution system, where the index file describes a plurality of alternative video streams, where at least one of the alternative video streams has the same aspect ratio as the display aspect ratio and is encoded at a maximum bitrate corresponding to the predetermined maximum likely data rate, and request a portion of at least one of the alternative streams using the index file.

Still another embodiment of the invention includes playing back content, including connecting to a content distribution system using a playback device via a network connection, where the network connection has a predetermined maximum likely data rate, obtaining an index file from the content distribution system using the playback device, where the index file describes a plurality of alternative video streams, where at least one of the alternative video streams has the same aspect ratio as the display aspect ratio and is encoded at a maximum bitrate corresponding to the predetermined maximum likely data rate, requesting a portion of at least one of the alternative streams using the playback device and the index file, and playing back the requested portions of the at least one alternative streams using the playback device.

Still another embodiment of the invention includes a machine readable medium containing processor instructions, where execution of the instructions by a processor causes the processor to perform a process including retrieving an encoding profile, where the encoding profile specifies a plurality of maximum bitrates including a maximum bitrate corresponding to the predetermined network connection maximum data rate, and a set of predetermined minimum adjusted macroblocks per second (MAMBPS) corresponding to each one of the maximum bitrates, selecting an encoding bitrate according to the corresponding value of the MAMBPS, selecting a resolution, sample aspect ratio and frame rate for each alternative stream, determining a maximum bitrate threshold beyond which higher video quality can be achieved using a higher resolution than the selected resolution at the selected frame rate of each alternative stream, selecting a maximum bitrate from the profile for each alternative stream, where the selected maximum bitrate corresponds to the MAMBPS that generates the highest positive difference between the AMBPS and the MAMBPS for the alternative stream, and generating each alternative stream by encoding the source video stream at the selected maximum bitrate, selected resolution, sample aspect ratio and frame rate.

In yet another additional embodiment of the invention, if the highest positive number that corresponds to the difference between the AMBPS and MAMBPS is zero, the resolution corresponding to the AMBPS is not allowed by the encoding profile.

Still another embodiment of the invention includes a machine readable medium containing processor instructions, where execution of the instructions by a processor causes the processor to perform a process including connecting to a content distribution system via a network connection, where the network connection has a predetermined maximum likely data rate, obtaining an index file from the content distribution system, where the index file describes a plurality of alternative video streams, where at least one of the alternative video streams has the same aspect ratio as the display aspect ratio and is encoded at a maximum bitrate corresponding to the predetermined maximum likely data rate, requesting a portion of at least one of the alternative streams using the index file, and playing back the requested portions of the at least one alternative streams.

BRIEF DESCRIPTION OF THE DRAWINGS

FIG. 6 is a table illustrating an example of a set of maximum bitrates and corresponding encoding and decoding minimum adjusted macroblocks per second in accordance with an embodiment of the invention.

DETAILED DISCLOSURE OF THE INVENTION

Figure 1:
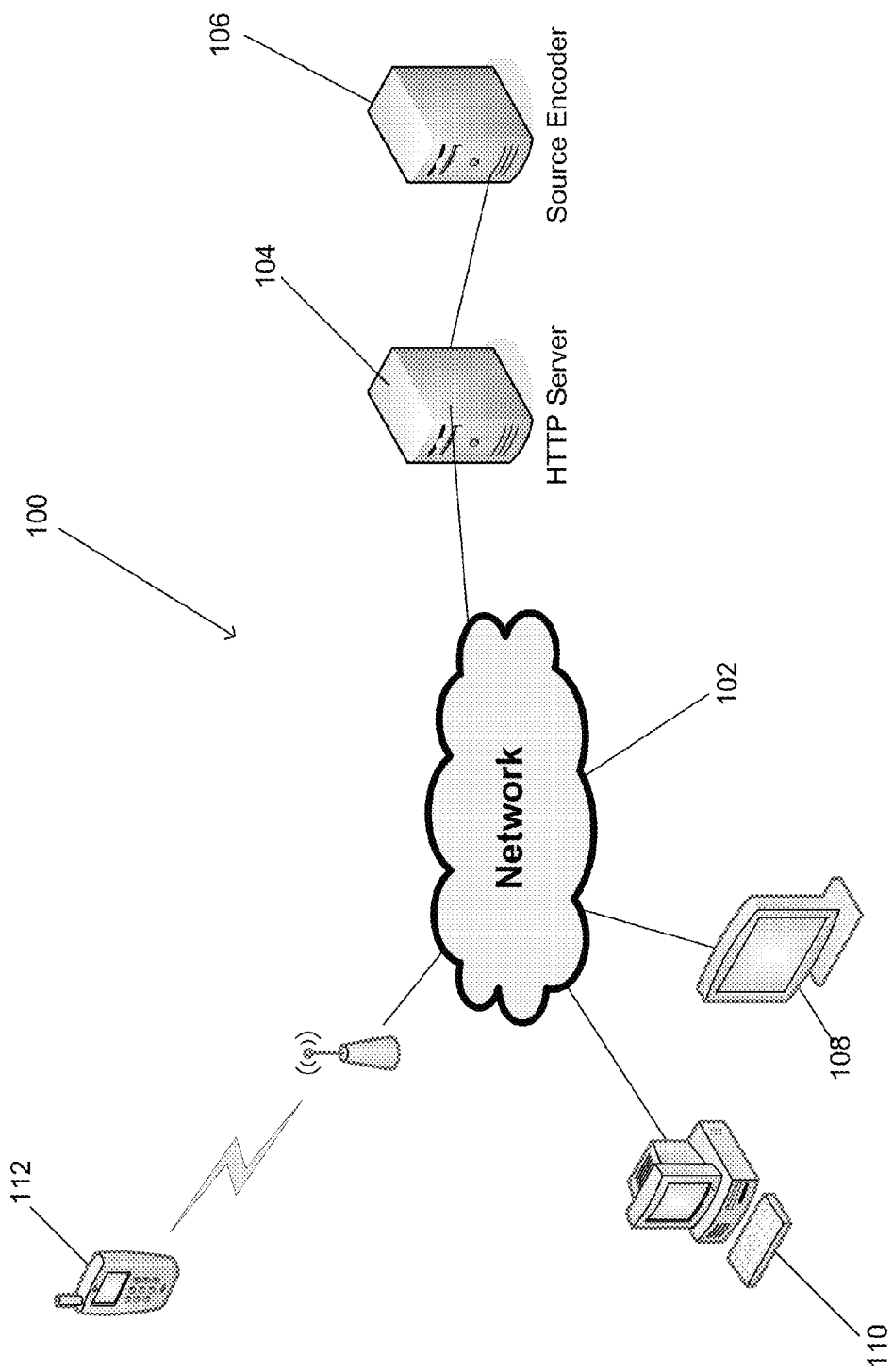
FIG. 1 is a network diagram of an adaptive bitrate streaming system configured to stream video encoded at recommended maximum bitrates in accordance with an embodiment of the invention.

Turning now to the drawings, systems and methods for adaptive bitrate streaming of alternative streams of video encoded at resolution and sample aspect ratio combinations and maximum bitrates corresponding to the display aspect ratios and network connection maximum data rates of playback devices receiving the streams in accordance with embodiments of the invention are illustrated. Adaptive bitrate streaming systems can stream alternative streams of video data encoded at maximum bitrates. In order to provide the highest quality video experience independent of the network data rate, the adaptive bitrate streaming systems switch between the available streams of video data throughout the delivery of the video data according to a variety of factors, including, but not limited to, the available network data rate and video decoder performance. Systems and methods for switching between video streams during playback are disclosed in U.S. patent application Ser. No. 13/221,682 entitled "Systems and Methods for Adaptive Bitrate Streaming of Media Stored in Matroska Container Files Using Hypertext Transfer Protocol." to Braness et al., filed Aug. 30, 2011, the disclosure of which is incorporated by reference herein in its entirety.

The data rate experienced by a playback device during adaptive bitrate streaming typically depends upon the technologies that the playback device utilizes to connect to the Internet and the Internet Service Provider that provides the Internet connection. Playback devices that utilize the same Internet Service Provider often experience similar maximum data rates that can deteriorate from time to time based upon network congestion and/or the processing load of the playback device. In adaptive bitrate streaming systems, the highest quality video that a playback device can receive is typically video encoded at a maximum bitrate equal to the maximum data rate of the network connection of a playback device. Where the video stream is transmitted in conjunction with other streams such as (but not limited to) an audio stream, a subtitle stream and/or a metadata stream, then the effective maximum data rate available for the video stream is equal to the maximum data rate, less the maximum data rates of each of the other streams along with a reserved data rate value that is greater than or equal to zero. An adaptive bitrate streaming system designed to deliver a video stream via the Internet to a variety of playback devices utilizing different Internet Service Providers can identify a set of effective maximum data rates corresponding to the effective maximum data rates likely to be experienced by each of the playback devices. For each effective maximum data rate in the set, the adaptive bitrate streaming system can then encode an alternative video stream having a maximum bitrate corresponding to the effective maximum data rate. In this way, a playback device is likely to be able to stream video encoded at the highest quality that can be supported by the playback device's network connection. In the event that streaming conditions deteriorate, the adaptive bitrate streaming system can stream video encoded at a lower maximum bitrate. Under normal streaming conditions, however, a video stream is available that is encoded to fully utilize the available network connection.

Due to standardization, video sources typically have a display aspect ratio selected from one of a number of common display aspect ratios. As is described in U.S. patent application Ser. No. 13/430,032, the performance of an adaptive bitrate streaming system can be enhanced by encoding each of the alternative streams using resolutions and sample aspect ratios that result in a common aspect ratio across the alternative streams corresponding to the display aspect ratio of the original video source. When a set of alternative video streams is encoded with resolutions and sample aspect ratios that result in an aspect ratio corresponding to the display aspect ratio of the original source, then each pixel of encoded video can be scaled to an integer number of pixels on the display and the playback device can smoothly transition between the streams without the need to resample the streams or add padding rows and/or columns to the decoded video to fit it to the display resolution.

U.S. patent application Ser. No. 13/430,032 also notes that the video quality of a stream encoded with a specific resolution and sample aspect ratio typically does not improve appreciably beyond a specific maximum bitrate threshold. Beyond that threshold, increasing the resolution of the encoded video can increase video quality.

Adaptive bitrate steaming systems in accordance with embodiments of the invention select a set of resolutions and sample aspect ratio combinations that have an aspect ratio corresponding to a specific display aspect ratio and encode an alternative stream at each resolution and sampling aspect ratio combination. The maximum bitrate used to encode each alternative stream is selected based upon a set of predetermined maximum bitrates corresponding to the maximum effective data rates of the network connections of the playback devices within the adaptive bitrate streaming system. The specific maximum bitrate selected for a specific resolution and sample aspect ratio combination may be determined based upon estimating the maximum bitrate threshold for the specific resolution and sample aspect ratio combination beyond which video quality does not appreciably improve and then identifying a maximum bitrate from the set of predetermined maximum bitrates that is the closest maximum bitrate that is less than the threshold. As is discussed further below, the maximum bitrate threshold for a specific resolution and sample aspect ratio combination typically depends upon the frame rate of the video.

By encoding at least one of the alternative streams of video provided by an adaptive bitrate streaming system in accordance with embodiments of the invention using a resolution and sample aspect ratio combination and maximum bitrates corresponding to the aspect ratio of the source content and maximum effective data rate of a playback device, the playback device can stream video encoded to provide the highest quality of video playback capable of being supported by the playback device given its network connection. By encoding lower maximum bitrate streams using resolution and sample aspect ratio combinations having the same aspect ratio as the source content's aspect ratio, the adaptive bitrate streaming system can smoothly transition to streams encoded at lower maximum bitrates when streaming conditions deteriorate. Adaptive bitrate streaming systems configured to stream alternative streams of video encoded at resolution and sample aspect ratio combinations and maximum bitrates corresponding to the display aspect ratios of the source content and network connection maximum effective data rates of the playback devices within the adaptive bitrate streaming system in accordance with embodiments of the invention are discussed further below.

System Overview

An adaptive bitrate streaming system in accordance with an embodiment of the invention is illustrated in FIG. 1. The adaptive bitrate streaming system 100 includes a source encoder 106 configured to encode source video as a number of alternative video streams at resolution and sample aspect ratio combinations and maximum bitrates corresponding to the display aspect ratios of the source content and network connection maximum effective data rates of the playback devices within the adaptive bitrate streaming system. In the illustrated embodiment, the source encoder is a server. In other embodiments, the source encoder can be any processing device including a processor and sufficient resources to perform the transcoding of source media (including but not limited to video, audio, and/or subtitles). The source encoding server 106 typically generates a top level index to a plurality of container files containing the streams, at least a plurality of which are alternative streams. Alternative streams are streams that encode the same media content in different ways. In many instances, alternative streams encode media content (such as but not limited to video) at different resolution and sample aspect ratio combinations and different maximum bitrates. In a number of embodiments, the alternative streams are encoded at different frame rates. In a number of embodiments, alternative video streams form sets of alternative video streams encoded with the same aspect ratio corresponding to the display aspect ratio of a set of source content. In many embodiments, the maximum bitrates used in the encoding of each alternative stream in a set of alternative streams is determined based upon the maximum effective data rate typically experienced by different sets of playback devices based upon factors including (but not limited to) the technology and Internet Service Providers the playback devices use to connect to the Internet. The top level index file and the container files are uploaded to a content distribution server 104. Although the source encoding server 106 is described above as generating the top level index file, in many embodiments the top level index file is dynamically generated in response to a request for a specific piece of content by a playback device.

In the illustrated embodiment, playback devices include personal computers 110, CE players 108, and mobile phones 112. In other embodiments, playback devices can include consumer electronics devices such as DVD players, Blu-ray players, televisions, set top boxes, video game consoles, tablets, and other devices that are capable of connecting to a server via HTTP and playing back encoded media. In the illustrated embodiment, a variety of playback devices use HTTP or another appropriate stateless protocol to request portions of a top level index file and the container files via a network 102 such as the Internet. Prior to a playback device performing adaptive bitrate streaming using portions of media from alternative streams contained within the container files, a bandwidth probe can be performed by the playback device to determine available bandwidth. Once the bandwidth probe has been completed, the playback device can utilize data within the top level index including (but not limited to) the maximum bitrate of each of the available streams to determine the initial streams from which to commence requesting portions of encoded media as part of an adaptive streaming process.

Once playback of content from the initial set of streams commences, the playback device utilizes the top level index to perform adaptive bitrate streaming of the content in response to changes in streaming conditions. In many adaptive bitrate streaming systems, the playback device can progress through a series of operational phases in which the playback device responds differently in each phase to changes in the streaming conditions. In a number of embodiments, stability in streaming conditions or improving streaming conditions can result in a transition to a phase in which the playback device assumes stable operating conditions, buffers more content, and is less responsive to fluctuations in streaming conditions. In many embodiments, a deterioration in streaming conditions results in a stream switch to a set of streams utilizing less bandwidth and resulting in the playback device transitioning to a phase in which the playback device assumes unstable operating conditions, buffers less content, and responds rapidly to variations in streaming conditions.

Figure 4:
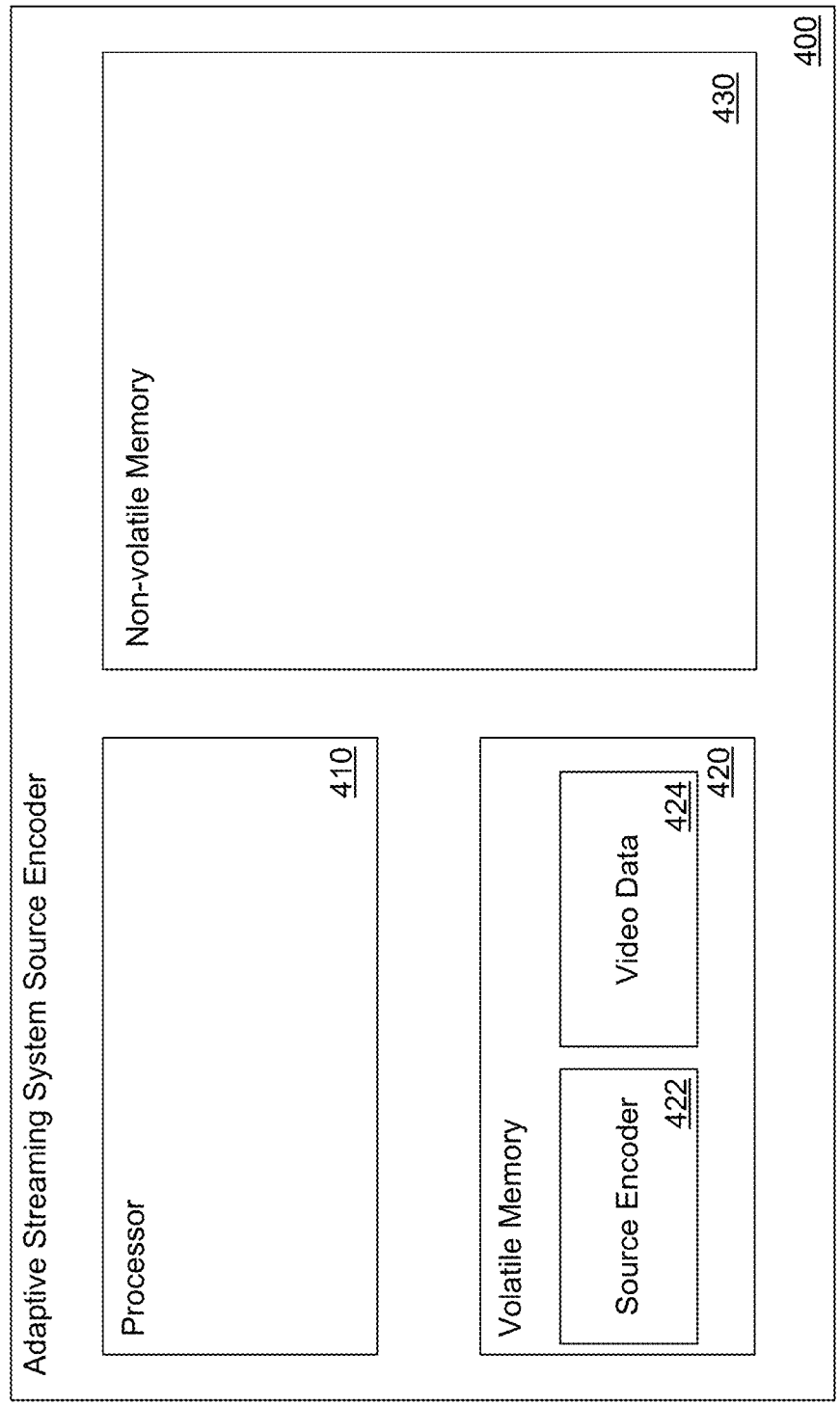
FIG. 4 conceptually illustrates a source encoder configured to encode video data utilizing different video bitrates in accordance with an embodiment of the invention.

In the illustrated embodiment, the adaptive bitrate streaming system includes one or more source encoders capable of encoding a stream of video content into alternative streams of video content encoded at resolution and sample aspect ratio combinations and maximum bitrates corresponding to the display aspect ratios of the source content and network connection maximum effective data rates of the playback devices within the adaptive bitrate streaming system. In many embodiments, the source encoder can be implemented using any device capable of encoding streams of multimedia, where the streams are encoded at different resolutions, sampling rates and/or maximum bitrates. The basic architecture of an adaptive streaming system source encoder in accordance with an embodiment of the invention is illustrated in FIG. 4. The adaptive bitrate streaming system 400 includes a processor 410 in communication with non-volatile memory 430 and volatile memory 420. In the illustrated embodiment, the volatile memory includes a source encoder 422 and alternative streams of video data 424. Although a specific architecture is illustrated in FIG. 4, any of a variety of architectures can be utilized to implement source encoders capable of encoding a stream of video content into alternative streams of video content encoded at resolution and sample aspect ratio combinations and maximum bitrates corresponding to the display aspect ratios of the source content and network connection maximum effective data rates of the playback devices within an adaptive bitrate streaming system in accordance with embodiments of the invention. In many embodiments, the variety of architectures include architectures where the application is located on disk or some other form of storage and is loaded into volatile memory at runtime. Furthermore, any of a variety of system architectures including (but not limited) to the system architecture illustrated in FIG. 1 can be utilized to perform video delivery in accordance with embodiments of the invention. Systems and methods for determining resolution and sample aspect ratios for alternative video streams and the maximum bitrates at which to encode the alternative video streams in accordance with embodiments of the invention are discussed further below.

Determining Maximum Bitrates

Adaptive bitrate streaming systems in accordance with embodiments of the invention select the maximum bitrate at which to encode a video stream having a given resolution and sample aspect ratio based upon the bitrate threshold beyond which video quality no longer appreciably improves and the maximum effective bitrates likely to be experienced by different classes of playback device within the adaptive bitrate streaming system. The set of maximum data rates for different classes of playback devices typically depends upon the requirements of a specific application. Once the set of maximum data rates is determined, the maximum bitrate at which to encode a video stream having a specific resolution, sample aspect ratio and frame rate can be determined by determining the bitrate threshold beyond which video quality no longer appreciably improves and then selecting the maximum data rate that is closest to and less than the bitrate threshold. As noted above, video quality at a given maximum bitrate can be higher at a lower resolution. Beyond a maximum bitrate threshold, however, improvements in video quality at a specific resolution diminish with increases in maximum bitrate. Typically, increasing resolution is the best way to achieve significant improvements in video quality beyond the threshold. The bitrate threshold is largely qualitative and can be defined in any of a variety of ways. Bitrate thresholds can be defined that generally apply to all video streams encoded at a given resolution, sample aspect ratio and frame rate irrespective of the content of the video. In many embodiments, maximum bitrate thresholds are in terms of a maximum number of macroblocks per second or as a maximum bitrate.

Figure 2:
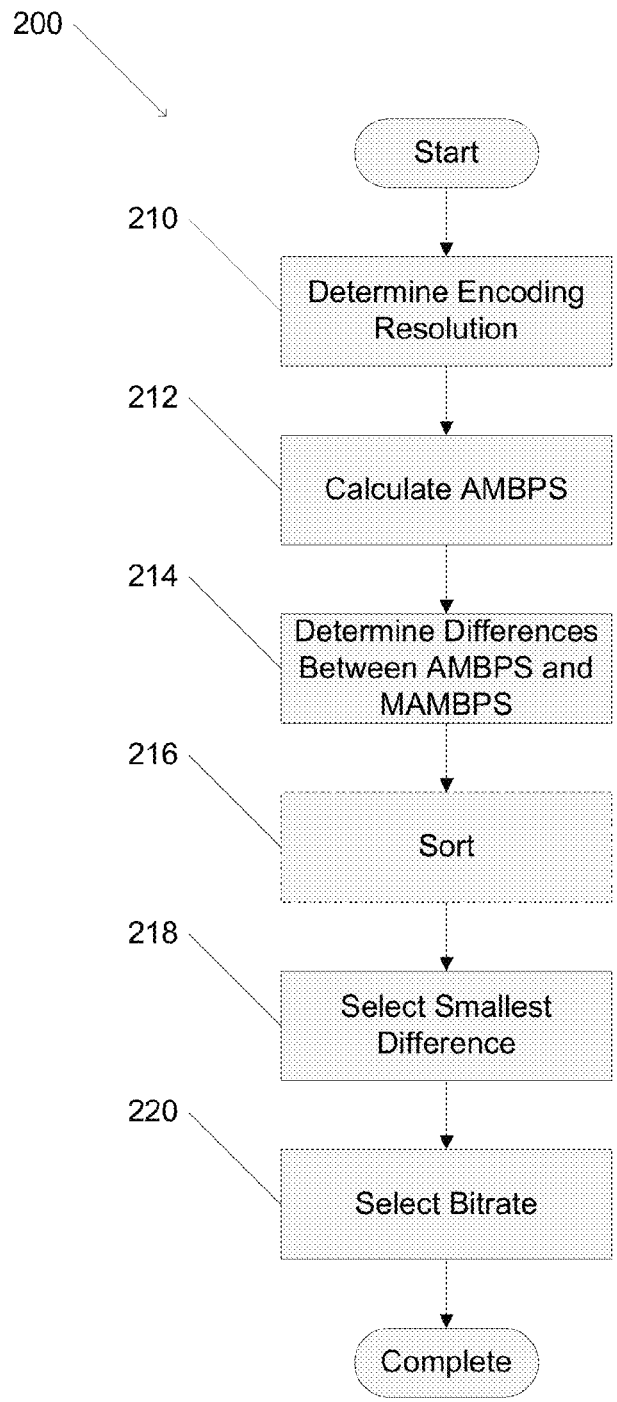
FIG. 2 is a flow chart illustrating a process for determining a recommended bitrate in accordance with an embodiment of the invention.

A generalized process for selecting maximum bitrates at which to encode a plurality of alternative streams using a profile of maximum bitrates corresponding to typical network connection data rates within an adaptive bitrate streaming system in accordance with an embodiment of the invention is illustrated in FIG. 2. The process 200 commences by selecting (210) resolution and sample aspect ratio combinations for the alternative streams. In a number of embodiments, processes similar to those outlined in U.S. patent application Ser. No. 13/430,032 are utilized to select resolution and sample aspect ratio combinations that have the same aspect ratio. The adjusted macroblocks per second (AMBPS) is then calculated (212) for each encoding resolution. In many embodiments of the invention, the following formula may be utilized to calculate the AMBPS for an encoding resolution:

$$AMBPS = ((width*height*FPS)/256)*AdjustmentFactor(FPS),$$

where width and height are the width and height of the encoding resolution, fps is the frame rate per second for the video data, and AdjustmentFactor(FPS) is a predetermined value based on the FPS of the video data.

In several embodiments, the following adjustment factors are used for the following common frame rates:

FPS=29.97, AdjustmentFactor(FPS)=1;
FPS=25, AdjustmentFactor(FPS)=1.1333; and
FPS=23.976, AdjustmentFactor(FPS)=1.1606.

In many embodiments, the following general formula may be applied to determine the adjustment factor for any variety of frame rates, including when the frame rate of the video data is greater than 30 FPS:

$$AdjustmentFactor(FPS)=1+((MaxFPS-FPS)/(MaxFPS*1.25)),$$

where FPS is the FPS of the video data and MaxFPS=Ceiling (FPS/30)*30.

Figure 5:
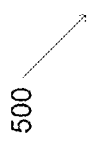
FIG. 5 is a table illustrating an example of a profile with defined maximum bitrates in accordance with an embodiment of the invention.

Once the AMBPS is calculated, it is compared to the set of minimum adjusted macroblocks per second (MAMBPS) that are associated with maximum bitrates determined based upon the effective maximum data rates that are likely to be experienced by playback devices within the adaptive bitrate streaming system to determine the differences (214) between the calculated AMBPS and the recommended MAMBPS. An example 600 of a set of MAMBPS in accordance with an embodiment of the invention is illustrated in FIG. 6. An example 500 of a set of predetermined bitrates in accordance with an embodiment of the invention is shown in FIG. 5, and the association of MAMBPS and those bitrates in FIG. 6. Once the differences are calculated, in many embodiments the differences are sorted (216). The smallest positive difference between the calculated AMBPS and the MAMBPS is selected (218) (i.e. the highest value of the minimum adjusted macroblocks per second value that is closest to and less than the AMBPS). The bitrate corresponding to the smallest positive difference is selected (220) as the maximum bitrate for the encoding of the alternative video stream at the specified resolution, sample aspect ratio and frame rate. In a number of embodiments, if the bitrate does not have a corresponding smallest positive difference, there is no corresponding encoding bitrate and the resolution and frame rate combination for the video data is not allowed. In other embodiments, if more than one bitrate choice is available for the same MAMBPS, then all of the corresponding bitrates are selected for encoding of the alternative video stream at the specified resolution, sample aspect ratio and frame rate.

In the event that the set of maximum bitrates changes in response to changes in the maximum data rates experienced by the playback device during the streaming of the video data, the maximum bitrates at which the alternative streams are encoded will change accordingly. An example of a set of video encoding bitrates and minimum adjusted macroblocks per second which could be utilized for adaptive bitrate streaming of alternative streams of video encoded at resolution and sample aspect ratio combinations and maximum bitrates corresponding to the display aspect ratios and network connection maximum data rates of playback devices receiving the streams in accordance with embodiments of the invention is illustrated in FIG. 6. As the maximum data rates experienced by the playback device vary during the streaming of video data, alternative streams of video data will be selected. Typically, the alternative streams of video include at least one alternative stream of video data that has a maximum bitrate corresponding to the maximum data rate that is likely to be experienced by the playback device. For example, an adaptive streaming system may be streaming multimedia content to a playback device with video data at a resolution of 1920×1080 at 30 frames per second. This video data may initially have an ideally determined encoded bitrate of 8969 Kbps with calculated adjusted macroblocks per second of 243000. Referring to FIG. 6 and FIG. 5, the column labeled Profile 1 indicates that a group of playback devices have network connections with an anticipated maximum bitrate of 8400 Kbps would have corresponding adjusted macroblocks per second of 217000. Therefore, the video stream at 1920× 1080 would have been encoded at 8400 Kbps instead of 8969 Kbps, and selected as the streamed video stream. During streaming, a playback device that typically experiences a maximum bitrate of 8400 Kbps may suffer some network congestion, reducing the maximum available bitrate to 2800 Kbps. In accordance with the above process, the adaptive bitrate streaming system will adjust the video data stream to be streamed by selecting an alternative stream having a maximum bitrate that is less than the data rate of the playback device's network connection. As seen in FIG. 6, the nearest bitrate is 2400, resulting in the adaptive streaming system switching to an alternative stream of video data having a minimum adjusted macroblocks per second of 102000 according to the column labeled Example Profile 1. For example, a stream of video data at a resolution of 1280×720 at 30 frames per second has a calculated adjusted macroblocks per second of 108000; therefore, the adaptive bitrate streaming system will switch to this alternative stream of video data to ensure smooth delivery and playback at the reduced network data rate. Additionally, the video data at resolution of 1280×720 may have been encoded according to the bitrate value of 2400 Kbps, as indicated by the table in FIG. 6. For a system that is based on the streaming characteristics of the column labeled Encode Profile, the video data at resolution of 1280×720 may have been encoded according to the bitrate values of 2400 and 1750 Kbps, because the closest minimum adjusted macroblocks per second value that is less than 108000 is 60000, and this corresponds to the two bitrates which have been specified in FIG. 5. It should be noted, however, that the alternative stream selected will be the stream with the smallest positive difference between the calculated adjusted macroblocks per second of the stream and the adjusted macroblocks per second of the maximum bitrate corresponding to the available data rate.

Although a specific process is described above, there are a variety of methods to determine the resolution and sample aspect ratios of alternative streams of video and the maximum bitrates at which to encode each of the alternative streams of video in accordance with embodiments of the invention. Systems and methods for determining adjustment factors for calculating the bitrate threshold beyond which the video quality of an alternative stream encoded at specific frame rate no longer appreciably improves in accordance with embodiments of the invention are discussed below.

The Adjustment Process

Figure 3:
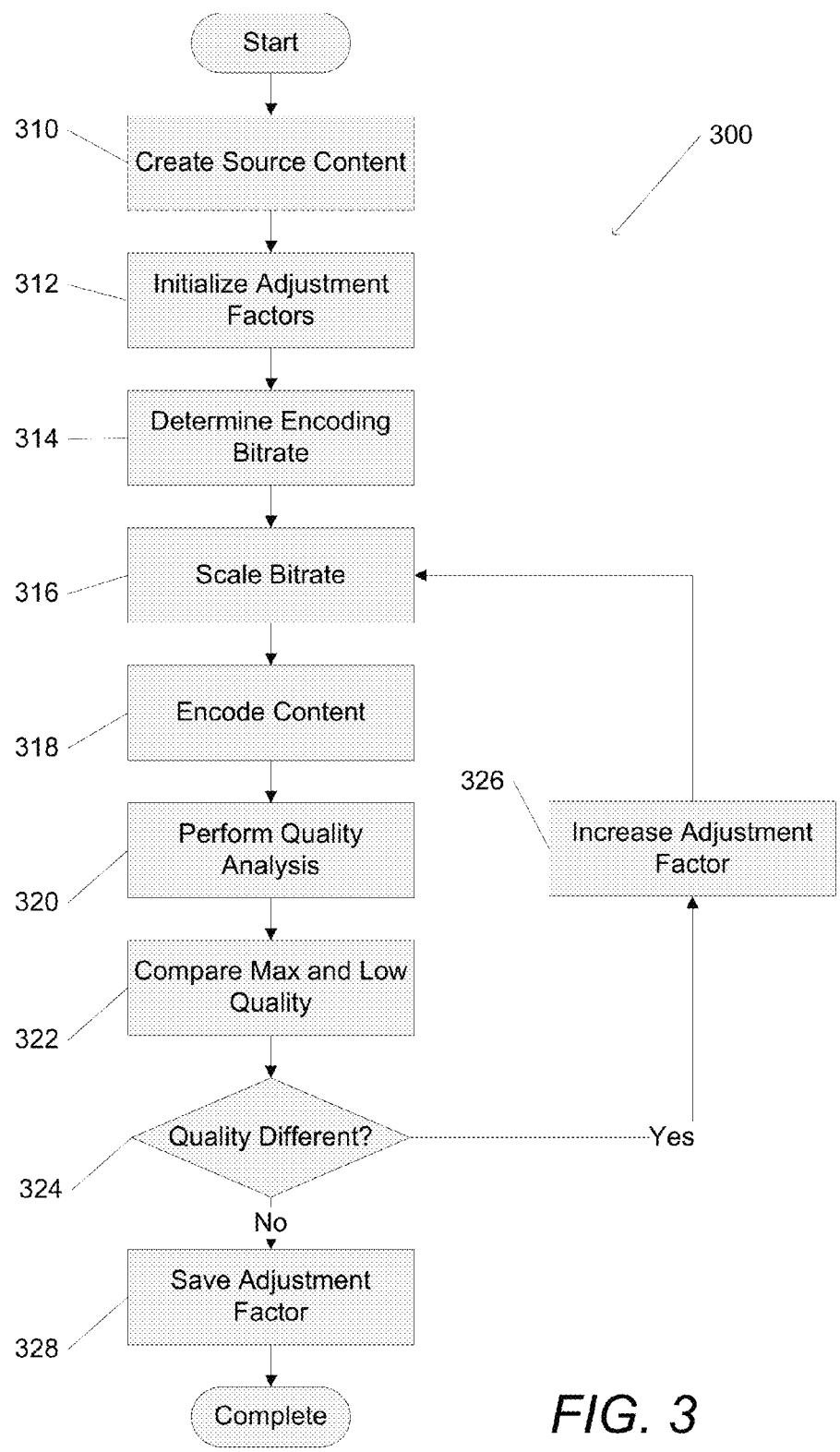
FIG. 3 is a flow chart illustrating a process for determining an adjustment factor in accordance with an embodiment of the invention.

Given video data at a particular frame rate, adjustments factors can be utilized when determining bitrate thresholds for video streams at lower frame-rates due to a quality normalization process between lower and higher frame rates. Frames of video data for content with lower frame rates experience a larger time gap between frames; as a result they may experience larger motion between objects between frames than those of a higher frame-rate video sequence. Additionally, due to the non-linear nature of motion, objects may experience a higher degree of prediction error due to the larger potential time gap between frames in the motion estimation process that is common to many video compression standards which may be utilized to encode video data in accordance with embodiments of the invention. In many video compression standards, the larger motion between objects may ultimately necessitate the allocation of more bits to the encoding of inter-frames in a lower frame rate sequence. Besides the inter-frames, it is also possible that a larger percentage of intra-frames are present in lower frame rate content. Other factors may also involve an adjustment to the linear calculation of AMBPS. A generalized process for determining an adjustment factor in accordance with embodiments of the invention is illustrated in FIG. 3. The process 300 may commence by creating (310) source content, such as video data, with varying frame rates. In a number of embodiments, the source content has been previously created. The adjustment factors are initialized (312) to 1. The encoding bitrate of the source content is determined (314) utilizing the frame rate and resolution of the source content, which may be utilized in a formula which provides an estimate for the encoding bitrate. The encoding bitrate is then scaled (316) by the adjustment factor. The content is then encoded (318). Once the content is encoded, the encoded content is analyzed (320). In several embodiments, the analysis (320) is an objective quality analysis. In a number of embodiments, the analysis (320) is a subjective quality analysis. After the content is analyzed, the quality of the encoded content at the maximum frame rate is compared (322) to the quality of the encoded content at the minimum frame rate. A comparison (324) is then made. If the quality of the encoded content at the minimum frame rate is lower than the quality of the encoded content at the maximum frame rate, the adjustment factor is increased (326) and the process begins anew starting with scaling (316) the encoding bitrate. In some embodiments, the adjustment factor may be decreased if the quality of the encoded content at the minimum frame rate is higher than the quality of the encoded content at the maximum frame rate. If the quality is not different, the adjustment factor is saved (328) for the lower frame rates.

In many embodiments of the invention, the process 300 may be performed for a variety of types of source content, where the adjustment factor is calculated as an average of all the encoding of the source content. In addition, alternative processes can be utilized to calculate adjustment factors for the purpose of determining the maximum bitrates at which to encode specific pieces of content based upon the resolution, and frame rate of the encoded content.

Although the present invention has been described in certain specific aspects, many additional modifications and variations would be apparent to those skilled in the art. It is therefore to be understood that the present invention may be practiced otherwise than specifically described, including playback devices where the set of streaming switching conditions utilized by the playback device are continuously changing, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A source encoder configured to encode a source video stream as a plurality of alternative streams of video for playback on a playback device, comprising:

an encoding profile, where the encoding profile specifies a plurality of maximum bitrates including a maximum bitrate corresponding to a predetermined network connection maximum data rate;

a processor configured by an encoding application to:

receive multimedia content, where the multimedia content comprises source video data having a primary resolution, a primary sample aspect ratio, and a primary frame rate; and encode the source video data as a set of alternative streams of video, where:

the resolution and sample aspect ratio of at least one of the alternative streams of video are selected to have an aspect ratio that is the same as a predetermined display aspect ratio; and at least one of the alternative streams is encoded at a maximum bitrate corresponding to the predetermined network connection maximum data rate;

wherein the encoding application further configures the processor to:

select a resolution, sample aspect ratio and frame rate for each alternative stream;

determine a maximum bitrate threshold beyond which higher video quality can be achieved using a higher resolution than the selected resolution at the selected frame rate of each alternative stream by configuring the processor to determine the maximum bitrate threshold using an adjusted number of macroblocks per second determined based upon the selected resolution, and frame rate;

select a maximum bitrate from the profile for each alternative stream, where the selected maximum bitrate is the highest maximum bitrate specified in the profile that is less than the maximum bitrate threshold determined for the alternative stream; and generate each alternative stream by encoding the source video stream at the selected maximum bitrate, selected resolution, sample aspect ratio and frame rate;

wherein the encoding application configures the processor to determine the adjusted number of macroblocks per second (AMBPS) as follows:

$$AMBPS=((width*height*FPS)/256)*AdjustmentFactor(FPS),$$

where width and height are the width and height of the encoding resolution,

FPS is the frame rate per second for the video data, and AdjustmentFactor(FPS) is a predetermined value based on the FPS of the video data;

wherein the adjustment factor is selected from the group comprising:

an AdjustmentFactor(FPS)=1, where FPS=29.97;
an AdjustmentFactor(FPS)=1.1333, where FPS=25; and
an AdjustmentFactor(FPS)=1.1606, where FPS=23.976.

2. The source encoder of claim 1, wherein the encoding application configures the processor to determine the adjustment factor is determined as follows:

$$AdjustmentFactor(FPS)=1+((MaxFPS-FPS)/(MaxFPS*1.25)) \text{ where MaxFPS is Ceiling(FPS/30)*30.}$$

3. A method of encoding a source video stream as a plurality of alternative streams of video for playback on a playback device, comprising:

retrieving an encoding profile using the source encoder, where the encoding profile specifies a plurality of maximum bitrates including a maximum bitrate corresponding to a predetermined network connection maximum data rate;

receiving multimedia content using a source encoder, where the multimedia content comprises source video data having a primary resolution, a primary sample aspect ratio, and a primary frame rate; and encoding the source video data using the source encoder as a set of alternative streams of video, where encoding the source video comprises:

selecting the resolution and sample aspect ratio of at least one of the alternative streams of video to have an aspect ratio that is the same as the predetermined display aspect ratio; and encoding at least one of the alternative streams at a maximum bitrate corresponding to the predetermined network connection maximum data rate;

wherein encoding the source video further comprises:

selecting a resolution, sample aspect ratio and frame rate for each alternative stream;

determining a maximum bitrate threshold beyond which higher video quality can be achieved using a higher resolution than the selected resolution at the selected frame rate of each alternative stream using the source encoder by using an adjusted number of macroblocks per second determined based upon the selected resolution, and frame rate;

selecting a maximum bitrate from the profile for each alternative stream using the source encoder, where the selected maximum bitrate is the highest maximum bitrate specified in the profile that is less than the maximum bitrate threshold determined for the alternative stream; and wherein the adjusted number of macroblocks per second (AMBPS) is determined as follows:

$$AMBPS=((width*height*FPS)/256)*AdiustmentFactor(FPS),$$

where width and height are the width and height of the encoding resolution, FPS is the frame rate per second for the video data, and AdjustmentFactor(FPS) is a predetermined value based on the FPS of the video data;

wherein the adjustment factor is selected from the group comprising:

an AdjustmentFactor(FPS)=1, where FPS=29.97;
an AdjustmentFactor(FPS)=1.1333, where FPS=25; and
an AdiustmentFactor(FPS)=1.1606, where FPS=23.976.

4. The method of claim 3, wherein the adjustment factor is determined as follows:

$$AdjustmentFactor(FPS)=1+((MaxFPS-FPS)/(MaxFPS*1.25))$$

where MaxFPS is Ceiling (FPS/30)*30.

* * * * *